United States Patent

Tabota et al.

(10) Patent No.: US 6,663,929 B1
(45) Date of Patent: Dec. 16, 2003

(54) LABELS AND BOTTLES FITTED WITH THEM

(75) Inventors: Norimi Tabota, Inuyama (JP); Tsutomu Oko, Inuyama (JP); Teruo Kurosawa, Osaka (JP); Kuniharu Mori, Inuyama (JP); Katsuhiko Nose, Osaka (JP); Hiroshi Shibano, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/216,095

(22) Filed: Dec. 18, 1998

(30) Foreign Application Priority Data

Dec. 19, 1997 (JP) .............................. 9-365213
Feb. 23, 1998 (JP) .............................. 10-040217
Apr. 17, 1998 (JP) .............................. 10-124072
Jun. 18, 1998 (JP) .............................. 10-170804

(51) Int. Cl.⁷ .................... B65D 23/08; B65D 71/08; G09F 3/10
(52) U.S. Cl. .................. 428/35.7; 428/207; 428/346; 428/480; 428/903.3
(58) Field of Search .................... 428/35.7, 36.91, 428/207, 200, 346, 480, 903.3

(56) References Cited

U.S. PATENT DOCUMENTS

| | | | |
|---|---|---|---|
| 5,587,405 A | * 12/1996 | Tanaka et al. ................ 522/98 |
| 5,618,546 A | 4/1997 | Wood et al. | |
| 5,885,678 A | * 3/1999 | Malhortra ................... 428/41.8 |
| 5,932,685 A | * 8/1999 | Mori et al. .................. 528/272 |
| 5,962,368 A | * 10/1999 | Poole .......................... 503/227 |
| 5,976,653 A | * 11/1999 | Collette et al. ............ 428/36.7 |

FOREIGN PATENT DOCUMENTS

| | | | |
|---|---|---|---|
| DE | 25 58 312 | | 7/1977 |
| EP | 0288536 B1 | * | 12/1992 |
| JP | 05080700 | | 2/1993 |
| JP | U 6-76968 | | 10/1994 |
| JP | 4112331792 A | * | 8/1999 |
| WO | WO 97/34810 | | 9/1997 |

OTHER PUBLICATIONS

European Patent Office Search Report for EP 98 12 3963.

* cited by examiner

*Primary Examiner*—Sandra M. Nolan
(74) *Attorney, Agent, or Firm*—Morrison & Foerster LLP

(57) ABSTRACT

A label having a thermoplastic polymer film and an ink layer formed on at least one surface thereof, the ink layer being removable in alkaline hot water, can easily be recycled after separated or without being separated from the bottle into polymer pellets with improved purity. The recycled polymer pellets are extremely suitable for the effective use of resources because they contain substantially no ink and can therefore find various applications.

14 Claims, 3 Drawing Sheets

LABELS AND BOTTLES FITTED WITH THEM

FILED OF INVENTION

The present invention relates to labels from which printed ink can be removed, and it also relates to bottles fitted with these labels, processes for their ink removal, processes for their recycling, and their recycled polymer pellets.

BACKGROUND OF THE INVENTION

In recent years, the use of polymer bottles, particularly those made of thermoplastic polymers, has been increasing year after year because of their excellent resistance to breakage, lightweight properties, and transparency as compared with conventional bottles made of glass, metals, or other materials. In particular, the conversion from conventional bottles to polymer bottles has remarkably progressed in the beverage industry, and they are used in great quantity, extending from small bottles to large bottles. Among other bottles, the use of bottles made mainly of polyethylene terephthalate (hereinafter referred to as "PET bottles") has remarkably risen.

Great interest has recently grown in global environmental problems, and there are great demands for some measure against the problem how to recycle bottles made of thermoplastic polymers. Much attention has been paid to the recycling of bottles made of thermoplastic polymers, particularly PET bottles, and early development is required for their recycling system. In general, PET bottles are fitted with various labels, e.g., stretch labels made of polyolefins; heat-shrinkable labels made of polyesters, polystyrene, polyvinyl chloride, or other polymers; and tack labels made of polypropylene or other polymers. In recycling PET bottles, they are usually collected from general consumers without removal of their labels, and then brought to the recycling interests. These bottles are washed, and their labels are removed by primary crushing, at which time, however, the crushed polymer materials may still include the labels in great quantity. Therefore, the conversion of PET bottles into recycled polymer pellets requires subsequent many steps such as secondary crushing, specific gravity separation of labels in a liquid, dehydration and drying, specific gravity separation of labels by air blowing, and pelletization. FIG. 3 is a flow chart showing a typical process for recycling thermoplastic polymers as their pellets from conventional labeled bottles.

In the recycling process for conventional labels and bottles fitted with these labels as described above, the labels are separated in various steps of separation; however, the recycling ratio of starting materials is decreased with an increase of purity in the recycled thermoplastic polymers. Further, the recycled thermoplastic polymers are contaminated with label resins, ink, and other impurities. In particular, the incorporation of ink may cause a serious problem that the recycled polymer pellets are colored as a whole even when contaminated in small quantity.

In order to achieve the effective recycling of bottles, the incorporation of labels and label ink should be prevented to increase the purity of recycled thermoplastic polymers. Many improvements have been made so far in the thermoplastic polymers as the label materials, and there have been proposed labels made of polymers (e.g., polystyrene, polyolefins such as polyethylene and polypropylene) that can easily be separated by specific gravity and may have low specific gravity than polyethylene terephthalate. The formation of ink layers cancels the advantage of low specific gravity, making it impossible to carry out complete separation.

There have also been proposed labels made of the same polyesters as used in PET bottles, which cause no problem even when incorporated into the PET bottles; however, no separation of ink layers can be made from the labels and the problem of how to prevent the coloring of recycled polymer pellets has not yet been solved.

In addition to the problem of coloring, there has not yet been solved another problem that the resulting recycled polymer pellets have insufficient purity. In particular, various oligomers including cyclic trimeric oligomers formed in the recycled polymer pellets cause a serious trouble that the molds or nozzles used in the spinning, extrusion, injection, or any other molding of the recycled polymer pellets may often be fouled with these oligomers and the products may often be stained with these oligomers to lower their quality. Therefore, the recycled polymer pellets obtained in this manner are difficult to use and they can find only limited applications.

SUMMARY OF THE INVENTION

Under these circumstances, the present inventors have intensively studied to solve the above-described problems and troubles in the recycling process for conventional labels and bottles fitted with these labels, thereby completing the present invention. In other words, it is an objective of the present invention to provide labels with easily removable ink layers, bottles fitted with these labels, processes for removing ink layers from these labels, processes for removing ink layers from these labels on the bottles, processes for recycling the ink-removed labels and bottles, as well as recycled polymer pellets.

Thus, a label of the present invention has a thermoplastic polymer film and an ink layer formed on at least one surface thereof, and the ink layer is removable in alkaline hot water.

Another label of the present invention has a thermoplastic polymer film and an ink layer, between which an intermediate layer removable in alkaline hot water is formed.

The bottle of the present invention has the label as described above. When the thermoplastic polymer film of the label is a heat-shrinkable film, the label may have a heat shrinkability of 0.1% or higher but lower than 80% along the circumferential direction of the bottle.

The process for ink removal from the labels or bottles as described above according to the present invention involves immersing the labels or bottles in alkaline hot water to remove the ink layers from the labels. The removed ink may be dried, pulverized, and separated from the labels by air blowing.

The process for recycling the bottles as described above according to the present invention involves melting the bottles fitted with the labels from which the ink layer has been removed by the above process for ink removal and forming the melt into recycled polymer pellets.

The recycled polymer pellets of the present invention are obtained by the above recycling process.

DETAILED DESCRIPTION OF THE INVENTION

Figure 1:
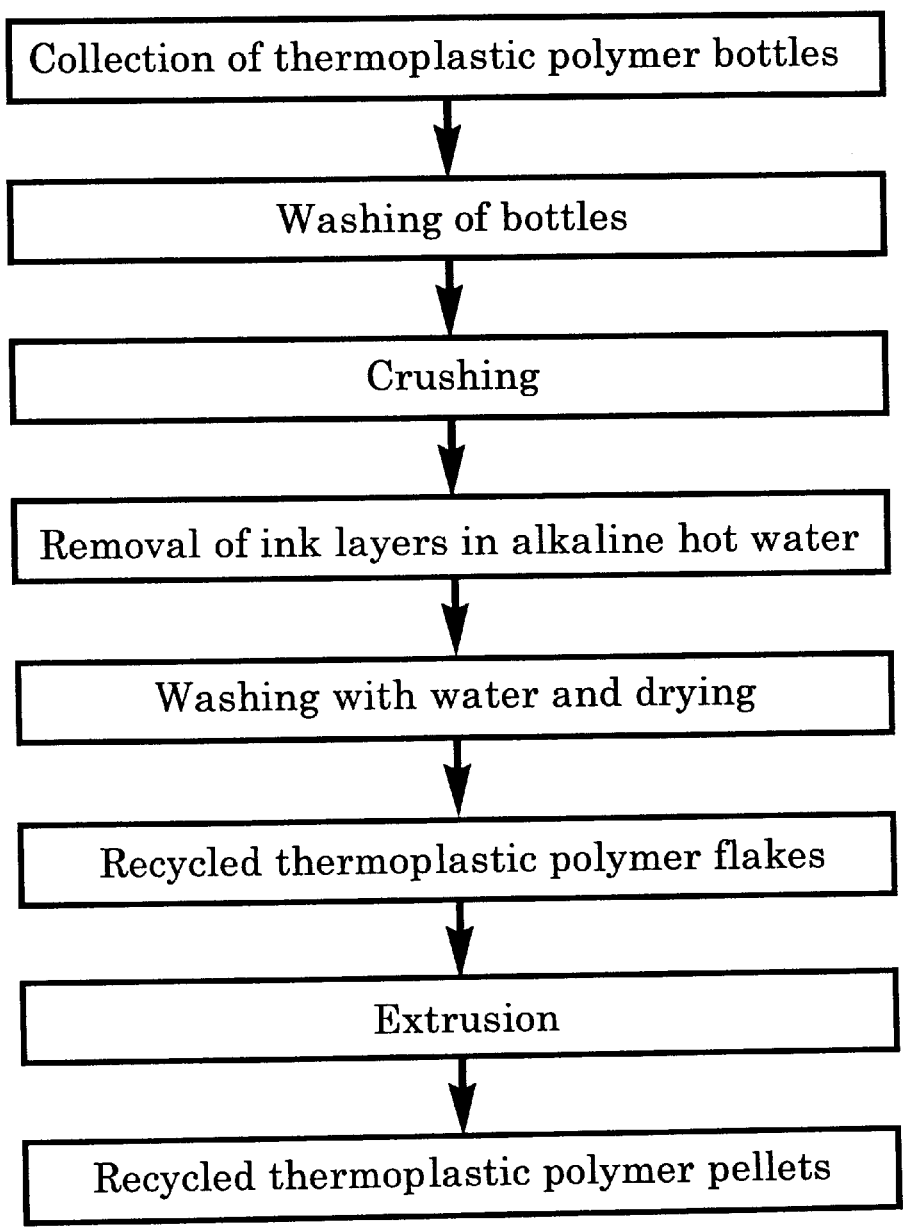
FIG. 1 is a flow chart showing a process for recycling the labeled bottles of the present invention into thermoplastic polymer pellets.

The label of the present invention has a thermoplastic polymer film, which is not particularly limited, as a base film. The thermoplastic polymer film may be shrinkable, non-shrinkable, or stretchable. More specifically, the shrinkable film may include mono- or bi-axially stretched films obtained from polyolefin-type films such as polyethylene films or polypropylene films, expanded or non-expanded polystyrene-type films, polyvinyl chloride films, or polyester-type films. The non-shrinkable film may include unstretched, mono- or bi-axially stretched films obtained from polyolefin-type films such as polyethylene films or propylene films, polystyrene-type films, polyvinyl chloride films, polyvinylidene chloride films, polyamide-type films such as nylon-6 films or nylon-66 films, polyester-type films, or heat-resistant engineering plastic films such as polyphenylene sulfide films or polyether ether ketone films. Preferred for the materials of labels to be fitted on the barrels of PET bottles are polyolefin-type films and polystyrene-type films, which can easily be separated, after crushed, in a liquid by specific gravity, and polyester-type films which will cause no problem even if incorporated into the recycled polymer pellets. Particularly preferred are polyester-type films, which require no separation by specific gravity or air blowing because they may be incorporated into the recycled polymer pellets if ink layers have been washed and removed therefrom. Thus, the label may preferably be made of a thermoplastic polymer of the same type as used in the bottle. As used herein, the thermoplastic polymers of the same type are those which have the same main repeating units and which are substantially compatible with each other.

More preferred are heat-shrinkable polyester-type films because the removal of the ink layer can be made more easily by separation at the interface between the heat-shrinkable film and the ink layer arising from the heat shrinkage of the heat-shrinkable film in the washing step. The heat-shrunk labels after fitted on the bottle by heat shrinkage may preferably have residual shrinkability, and they may preferably have heat shrinkability of 0.1% or higher but lower than 80% along the circumferential direction of the bottle after removed from the bottle and immersed into hot water at 95° C. for 10 seconds. If the heat shrinkability is less than 0.1%, the shrinkage of the ink layer and the thermoplastic polymer film will cause a decrease in the stress occurring at their interface to lower the ink removal ratio. On the other hand, heat shrinkability of 80% or higher is not preferred because the label will exhibit large bending to lower the ink removal ratio.

The following will describe the production process and characteristics of heat-shrinkable polyester-type films particularly preferred for use as the base films of labels.

The heat-shrinkable polyester-type films may usually be formed of a polyester containing terephthalic acid or 2,6-naphthalenedicarboxylic acid as the main acid component and ethylene glycol or tetramethylene glycol as the main glycol component. They may also be formed of a polyester containing any other main acid and glycol components. As the copolymerizable acid component, there can be used isophthalic acid, cyclohexanedicarboxylic acid, 2,6-naphthalenedicarboxylic acid, or terephthalic acid. As the copolymerizable glycol component, there can be used tetramethylene glycol, ethylene glycol, trimethylene glycol, or cyclohexane dimethanol.

The film obtained by extrusion, calendering, or any other method is stretched in the first direction at a ratio of 2.5 to 7.0 times, preferably 3.0 to 6.0 times, and then stretched in the second direction perpendicular to the first direction at a ratio of 1.0 to 2.0 times, preferably 1.1 to 1.8 times. The stretching in the first direction is carried out for the main purpose of having an effect on the film to attain high heat shrinkability. The stretching in the second direction perpendicular to the first direction is quite useful for solving poor impact resistance and tear resistance of the mono-axially stretched film.

The heat-shrinkable film has heat shrinkability of about 30% to about 80% in the main shrinkage direction. If the film is stretched at a ratio more than 2.0 times in the second direction perpendicular to the first direction, it exhibits too much heat shrinkage in the direction perpendicular to the main shrinkage direction, so that the finish on the film surface after the heat shrinkage becomes undulated. In order to prevent the undulation of the film, it is recommended that the heat shrinkability in the direction perpendicular to the main shrinkage direction is set at 15% or lower, preferably 8% to 9% or lower, and more preferably 7% or lower. The means of stretching is not particularly limited, and various methods can be applied, such as roller stretching, long-distance stretching, or tenter stretching. The heat-shrinkable film may be in any shape, such as flat or tubular.

The film may be bi-axially stretched in a successive or simultaneous manner, mono-axially stretched, or any combination thereof The film to be used in the label of the present invention is stretched, for example, mono-axially in the machine or transverse direction, or bi-axially in the machine and transverse directions. In particular, if the film is bi-axially stretched in the machine and transverse directions, stretching in the transverse direction is effectively achieved by successive bi-axial stretching, in which the film is stretched earlier in either one of the two directions, the order of which may be earlier for any of these directions. If the film is bi-axially stretched in a simultaneous manner, the order of stretching may be either simultaneous in the machine and transverse directions or successive in the machine or transverse direction and then in the transverse or machine direction, respectively. The thermosetting of the film after the stretching may be carried out depending on the purpose, and for preventing the change of film size under high temperatures in summer, it is recommended that the film is allowed to pass through the heat zone at 30° C. to 150° C. for about 1 to 30 seconds. The film may be elongated up to 70% at the highest either before or after the heat setting, or both. In particular, it is preferred that the film be elongated in the main shrinkage direction and not elongated, but relaxed, in the direction perpendicular to the main shrinkage direction.

For the purpose of attaining that the heat-shrinkable film to be used in the label of the present invention can exhibit preferable characteristics, effective means are pre-heating and stretching at a temperature higher than the mean glass transition point (Tg) of a polyester, e.g., at a temperature of about Tg+80° C., as well as stretching at the above ratio. In particular, the above temperature of treatment in the stretching along the main direction (i.e., the main shrinkage direction) is quite important for the reduction of heat shrinkability in the direction perpendicular thereto and the control of the minimum value of heat shrinkability in the temperature range of 80° C.±25° C. as described above. The above shrinkable properties can be made better and more stable by cooling the film after the stretching while keeping it under tension after elongation to impose stress thereon, or by subsequent further cooling the film after the stretching.

The film thus obtained may preferably have the coefficient of planar orientation equal to or lower than $100 \times 10^{-3}$. If the coefficient of planar orientation is higher than $100 \times 10^{-3}$, the film can easily be broken against impact external force and can easily be torn only by small external damage. The film may preferably have a birefringence index of $15 \times 10^{-3}$ to $160 \times 10^{-3}$. If the birefringence index is smaller than $15 \times 10^{-3}$, the heat shrinkability and shrinkage stress in the machine direction will become insufficient. If the birefringence index is larger than $160 \times 10^{-3}$, the scratch resistance and impact strength will be deteriorated. In both cases, the films, even if obtained, will be less useful for practical use. The thermoplastic polymer film to be used in the label of the present invention may have a thickness of 6 to 250 $\mu$m, which is suitable for practical use.

The label of the present invention has an ink layer on at least one surface of the heat-shrinkable polymer film, the ink layer being removable in alkaline hot water. The ink layer removable in alkaline hot water exhibits an ink removal ratio of 90% or higher, when a sample label of 1 g in weight is cut into square-shaped flakes of 1 cm in each side and then stirred in 100 cc of a 3% aqueous sodium hydroxide solution at 90° C. for 30 minutes, followed by washing with water and drying. The removal of the ink layer is attributed to the fact that the ink layer can largely swell or be dissolved in alkaline hot water. In the practical recycling process, washing with weak alkaline hot water is usually carried out for about 30 minutes; therefore, ink layers capable of coming off during the washing are suitable for practical use.

The method for giving the above properties to the ink layer, although it is not particularly limited, may involve, for example, the addition of a compound soluble or capable of swelling in alkaline hot water to ink usually used (e.g., ink consisting of colorants such as pigments or dyes, binders, and volatile organic solvents). The compound soluble or capable of swelling in alkaline hot water may include inorganic salts such as sodium chloride, sodium sulfate, potassium nitrate, sodium acetate and ammonium sulfate; organic acids or their salts, such as ascorbic acid, sebacic acid and azelaic acid; high molecular weight polyethers such as polyethylene oxide and polytetramethylene oxide; polyvinyl alcohol, polyacrylic acid or their metal salts, and copolymers thereof. The above compound may be in liquid state at room temperature, examples of which are alcohols such as methyl alcohol, ethyl alcohol, isopropyl alcohol, n-propyl alcohol, isobutyl alcohol, tert-butyl alcohol, cyclohexyl alcohol and benzyl alcohol; monomethyl, monoethyl, monopropyl or monobutyl ethers, or monomethyl or monoethyl esters, of polyhydric alcohols such as ethylene glycol, diethylene glycol, triethylene glycol, glycerin and pentaerythritol; dioxane, acetone, methyl ethyl ketone, diacetone alcohol, dimethylformamide, and tetrahydrofuran. Preferred are those with high boiling points, particularly with boiling points of 50° C. or higher, because they should remain in the ink layer. More specifically, monoalkyl ethers of polyhydric alcohols are particularly preferred because of their good solubility in alkaline hot water.

The content of the above compound as the amount of the compound remaining in the ink layer, although it may be altered depending on the kind of the compound, is preferably in the range of 0.0001 wt % to 50 wt %. If the content is lower than 0.0001 wt %, the ink layer cannot sufficiently come off in the washing step, making it difficult to attain the objective of the present invention. On the other hand, contents higher than 50 wt % are not preferred because the ink layer will have deteriorated mechanical properties such as scratch resistance.

The ink to which the above compound has been added and which can be used in the label of the present invention, further contains ink pigments, binders, solvents, and other ingredients. As the binder, there can be used, for example, those of the nitrocellulose-type, chlorinated polypropylene-type, polyester-type, acryl-type, polyester urethane-type, or acryl urethane-type. For the polyester-type film, particularly preferred is ink containing a binder of the polyester-type, acryl-type, polyester urethane-type, or acryl urethane-type. The pigment to cause coloring of ink, although it is not particularly limited, may be even those which have been widely used. The ink to be used in the present invention may contain additives, if necessary, such as weathering agents, fluorescent whitening agents, lubricants and crosslinking agents.

The method for printing the ink layer to give the label of the present invention may be any of the methods well known in the art, such as gravure, flexographic or screen printing. The ink layer may preferably have a thickness of 0.1 to 100 $\mu$m. If the thickness is less than 0.1 $\mu$m, the development of ink color will become insufficient. On the other hands, if the thickness is more than 100 $\mu$m, the ink layer will become brittle and can easily be cracked.

The label of the present invention may further have an intermediate layer between the ink layer and the thermoplastic polymer film, in which the intermediate layer can easily swell or be dissolved in alkaline hot water to remove the ink layer from the thermoplastic polymer film. As used herein, the intermediate layer to remove the ink layer in alkaline hot water refers to an intermediate layer attaining an ink removal ratio of 90% or higher, when a sample label of 1 g in weight is cut into square-shaped flakes of 1 cm in each side and them stirred in 100 cc of 3% aqueous sodium hydroxide solution at 90° C. for 30 minutes, followed by washing with water and drying. The removal of the ink layer is attributed to the fact that the intermediate layer can largely swell or be dissolved in alkaline hot water. In the practical recycling process, washing with weak alkaline hot water is usually carried out for about 30 minutes; therefore, ink layers capable of coming off during the washing are suitable for practical use.

As a matter of course, when an intermediate layer removable in alkaline hot water is formed between the thermoplastic film and the ink layer, the ink layer is not necessarily required to have the property of being removable in alkaline hot water.

In order to improve the purity of recycled polymer pellets as high as possible, it is preferred that the intermediate layer itself can be removed at a ratio of 90% or higher by the above treatment.

The resin capable of swelling or soluble in alkaline hot water to be used in the intermediate layer is not particularly limited, so long as it has a function in the removal of an ink layer. The resin should have an incorporated hydrophilic group so that it can swell or be dissolved in alkaline hot water. The hydrophilic group may include hydroxyl group, polyethylene glycol group, carboxylic acid group, carboxylic acid salt group, sulfonic acid group, sulfonic acid salt group, phosphonic acid group, and phosphonic acid salt group.

The label of the present invention is used as the label for bottles; it is, therefore, required to ensure that the ink layer does not come off under the ordinary conditions of use for bottles. More specifically, it is preferred that the ink removal ratio is 5% or lower, when a sample label of 1 g in weight is cut into square-shaped flakes of 1 cm in each side and then stirred in 100 cc of ion-exchanged water (25° C., pH 6–8) for 30 minutes, followed by washing with water and drying. The kind and amount of hydrophilic group should be adjusted.

The resin with a hydrophilic group selected from carboxylic acid salt group, sulfonic acid group, and phosphonic acid salt group may preferably be neutralized with an amine having a boiling point of 200° C. or lower.

The resin in which a hydrophilic group is introduced may include polyester-type resins, polyacrylic-type resins, acryl-modified polyester resins, acryl-modified polyurethane resins, and polyolefin-type resins. Preferred are polyester-type resins, acryl-modified polyester resins, and acryl-modified polyurethane resins. Preferred examples of the acryl-modified polyester resins are polyesters with grafted acrylic polymers as the branches, wherein the acrylic polymers are obtained by the method in which acrylic macro monomers with at least two hydroxyl groups only at one end are used in the polyester synthesis or by the method in which after the polyester synthesis acrylic monomers are polymerized in the presence of these polyester resins. Preferred examples of the acryl-modified polyurethane resins are polyurethanes with grafted acrylic polymers as the branches, wherein the acrylic polymers are obtained by the method in which acrylic macro monomers with at least two hydroxyl groups only at one end are used in the polyurethane synthesis or by the method in which after the polyurethane synthesis acrylic monomers are polymerized in the presence of these polyurethane resins.

The addition of a compound soluble or capable of swelling in alkaline hot water to these resins can also be employed, although it is not particularly limited. The compound soluble or capable of swelling in alkaline hot water may include inorganic salts such as sodium chloride, sodium sulfate, potassium nitrate, sodium acetate and ammonium sulfate; organic acids or their salts, such as ascorbic acid, sebacic acid and azelaic acid; high molecular weight polyethers such as polyethylene oxide and polytetramethylene oxide; polyvinyl alcohol, polyacrylic acid or their metal salts, and copolymers thereof. The above compound may be in liquid state at room temperature, examples of which are alcohols such as methyl alcohol, ethyl alcohol, isopropyl alcohol, n-propyl alcohol, isobutyl alcohol, tert-butyl alcohol, cyclohexyl alcohol and benzyl alcohol; monomethyl, monoethyl, monopropyl or monobutyl ethers, or monomethyl or monoethyl esters, of polyhydric alcohols such as ethylene glycol, diethylene glycol, triethylene glycol, glycerin and pentaerythritol; dioxane, acetone, methyl ethyl ketone, diacetone alcohol, dimethylformamide, and tetrahydrofuran. Preferred are those with high boiling points, particularly with boiling points of 50° C. or higher, because they should remain in the intermediate layer. More specifically, monoalkyl ethers of polyhydric alcohols are particularly preferred because of their good solubility in alkaline hot water.

The intermediate layer is formed by applying the above resin capable of swelling or soluble in alkaline hot water to the thermoplastic polymer film according to the ordinary method or during the preparation of the thermo-plastic polymer film, followed by drying and stretching.

If the resin capable of swelling or soluble in alkaline hot water can be melt extruded, the intermediate layer may be formed by its coextrusion with the thermoplastic polymer film. Furthermore, the intermediate layer may also be formed by the ordinary lamination method such as dry lamination or extrusion lamination. For the low-priced preparation of such a layered film, the application method is most suitable.

The bottle of the present invention may have a cover or a cap, which is preferably made of a thermoplastic polymer of the same type as used in the bottle. The thermoplastic polymer preferably contains at least one selected from ethylene terephthalate and ethylene naphthalate repeating units. For example, the cover or cap is made mainly of a polyester containing ethylene terephthalate as the main repeating unit. The polyester may preferably be a homopolymer consisting essentially of polyethylene terephthalate, or may also be its copolymer with copolymerizable monomers substituted for part of the terephthalic acid components. The copolymerizable monomers may be those which have been recited above as the copolymerizable monomers for the labels made of a thermoplastic polyester, examples of which monomers are isophthalic acid, cyclohexanedicarboxylic acid, and 2,6-naphthalenedicarboxylic acid. The ratio of copolymerizable monomers in the copolymer may vary depending on the case of either a cover or a cap; for caps, the ratio is usually 50 mol % or lower, preferably 30 mol % or lower.

In the present invention, the removal of an ink layer from the label is achieved by immersing the label in alkaline hot water. In practical use, for example, the removal is carried out by cutting a label of 1 g in weight into flakes of 1 cm or smaller in each side and stirring the flakes in 100 cc of a 30% aqueous sodium hydroxide solution at 90° C. for 30 minutes or longer, followed by washing, filtration, further washing with water, and drying, so that the ink removal ratio comes to 90% or higher. More specifically, the form of crushed labels in terms of the size of preferably crushed films is preferably 0.1 by 0.1 millimeter square to 10 by 10 centimeters square. If the crushed labels are smaller than 0.1 by 0.1 millimeter square, the efficiency in the subsequent filtration step will be deteriorated. On the other hand, if the crushed labels are larger than 10 by 10 centimeters square, the removal of ink will require more time. The hot water to be used in the ink removal step should be alkaline and may preferably have a pH of 9.0 or higher. The method for making hot water alkaline may involve the addition of an alkaline substance such as sodium hydroxide, potassium hydroxide or ammonia to the hot water. The hot water may preferably have a temperature of 50° C. to 100° C., in which higher temperatures improve the efficiency of ink removal. The amount of hot water to be used, although it may vary depending on the size of labels, should be 5 to 20 times higher than that of roughly crushed labels or 0.2 to 5 times higher than that of finely crushed labels. For the improvement of efficiency, ink removal may be carried out in a cyclic manner. The time for ink removal is preferably within 30 minutes from the viewpoint of the recycling process. The ink removal ratio can be allowed when it reaches 90% or higher, preferably 98% or higher, and more preferably 99.9% or higher.

For the ink separation by air blowing, it is preferred that the crushed bottles and labels as well as the ink layer after the ink separation in alkaline hot water are washed with water and dried, followed by pulverization of the ink layer. The size of pulverized ink particles is preferably 1 nm to 1 mm. If the particle size is smaller than 1 nm, the pulverized ink particles will remarkably scatter, which causes a serious problem in the recycling process. If the particle size is larger than 1 mm, it will become difficult to carry out the ink separation by air flowing. The wind velocity in the ink separation by air blowing is preferably 1 to 50 m/sec. If the wind velocity is lower than 1 m/sec or higher than 50 m/sec, it will become difficult to attain the effective ink separation. The apparatus to be used in the ink separation by air blowing, although it is not particularly limited, may be any apparatus well known in the art, more specifically cyclone as an example.

The bottle of the present invention can be fitted with the above label by the ordinary method so that the label is wound around at least the barrel of the bottle. The bottles fitted with the labels of the present invention which have been collected after use are typically washed and then crushed, and the crushed materials are subjected to the ink removal step in which the ink layers are removed in alkaline hot water, followed by washing with water and drying, to give thermoplastic polymer flakes recycled from the bottles and labels. These flakes can be recycled as thermoplastic polymer pellets with an extruder.

FIG. 1 is a flow chart showing a process for recycling the labeled bottle of the present invention into thermoplastic polymer pellets.

Figure 2:
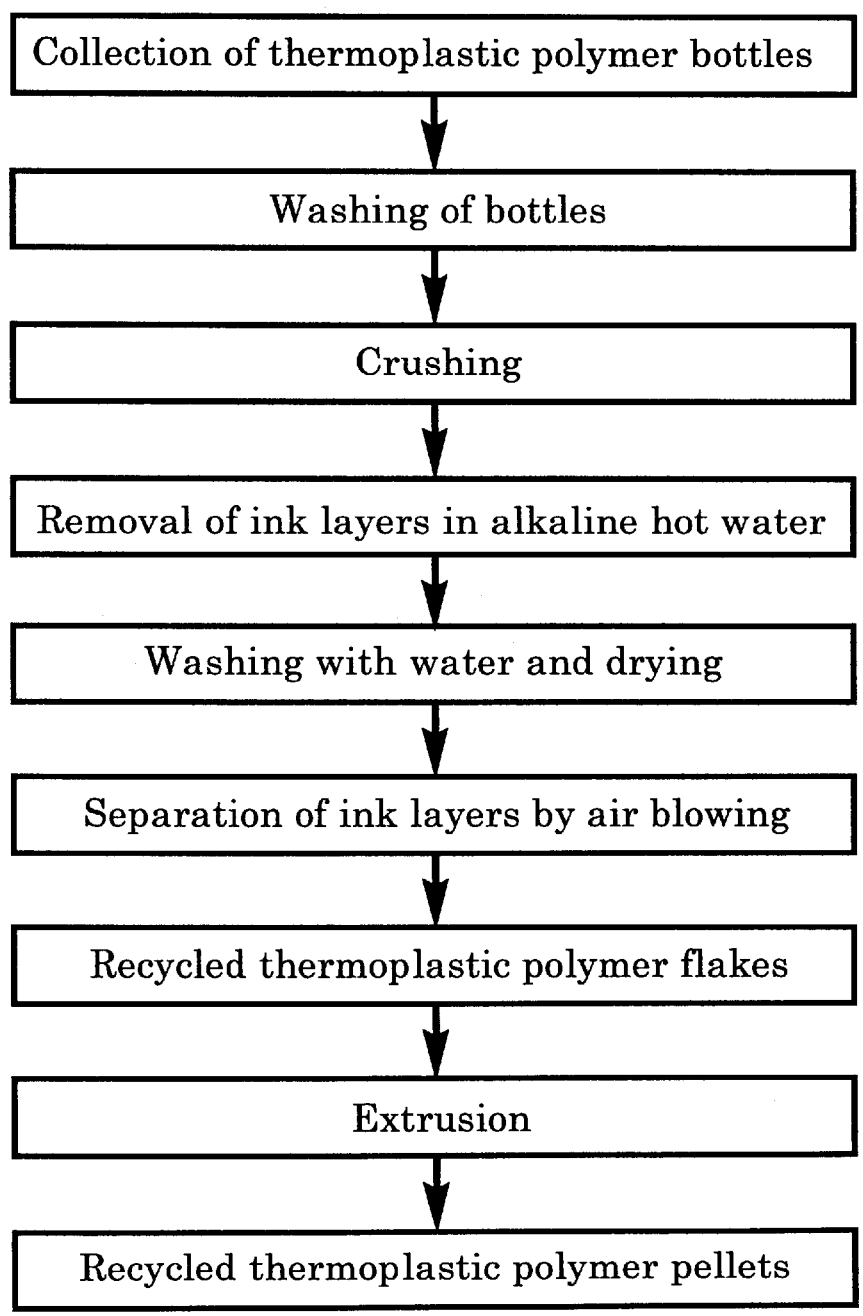
FIG. 2 is a flow chart showing another process for recycling the labeled bottles of the present invention into thermoplastic polymer pellets.
Figure 3:
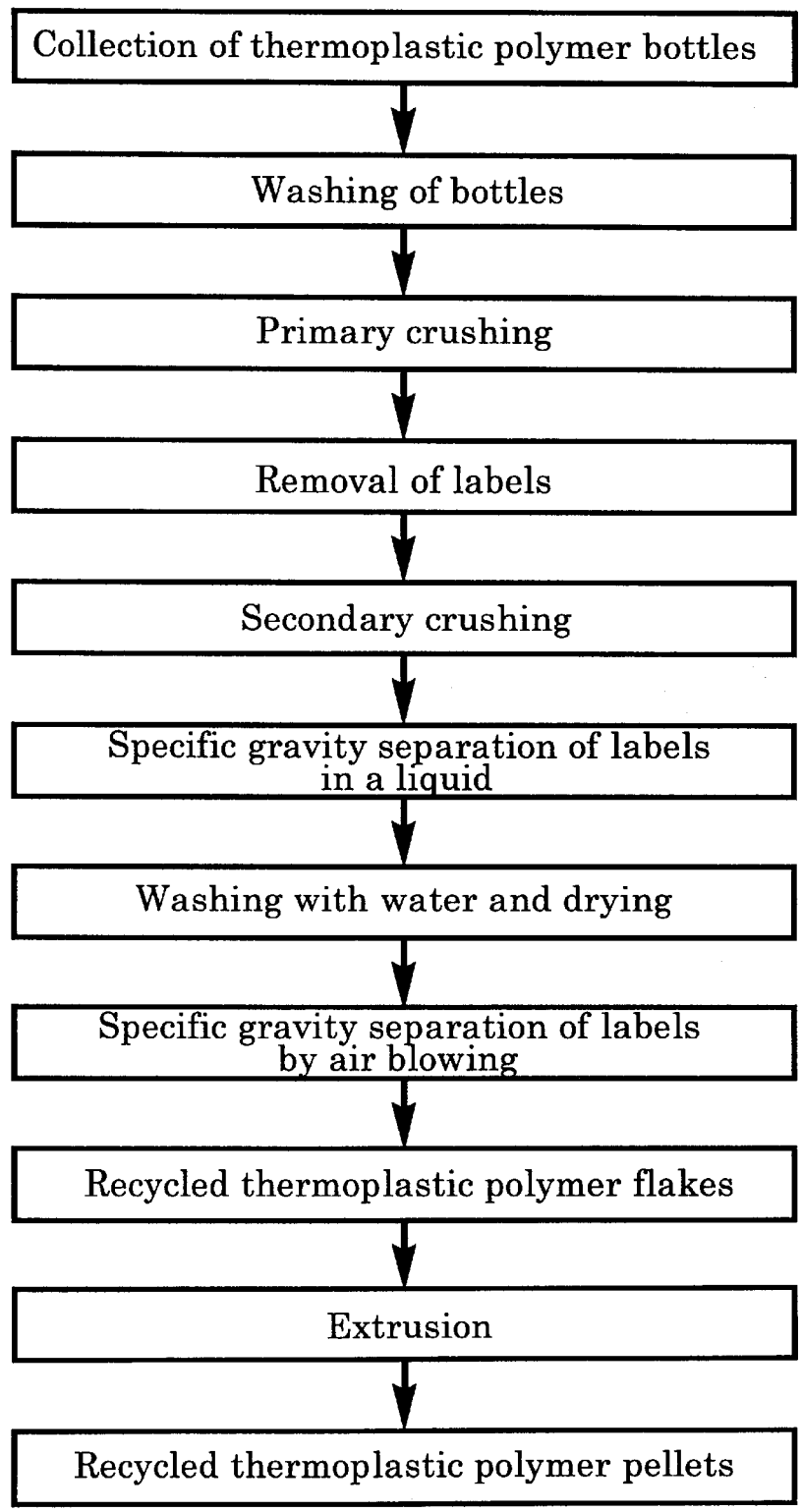
FIG. 3 is a flow chart showing a process for recycling the conventional labeled bottles into thermoplastic polymer pellets.

FIG. 2 is a flow chart showing another process for recycling the labeled bottle of the present invention into thermoplastic polymer pellets.

The following will describe the bottle of the present invention to be fitted with the label as described above.

The bottle of the present invention is made mainly of polyethylene terephthalate that can be obtained by reacting terephthalic acid or its ester derivative with ethylene glycol.

The polyethylene terephthalate may contain other dicarboxylic acids (including their ester derivative) and/or glycols as copolymerized monomers at a ratio of 40 mol % or lower, preferably 20 mol % or lower, and more preferably 5 mol % or lower, relative to the total amount of dicarboxylic acid or glycol components, respectively. Most preferred is a polymer consisting essentially of terephthalic acid and ethylene glycol.

The dicarboxylic acids other than terephthalic acid may include aromatic dicarboxylic acids such as phthalic acid, isophthalic acid, naphthalene dicarboxylic acid, diphenyldicarboxylic acid, and diphenoxyethane dicarboxylic acid; aliphatic dicarboxylic acids such as adipic acid, sebacic acid, azelaic acid, and decane dicarboxylic acid; and alicyclic dicarboxylic acids such as cyclohexane dicarboxylic acid. These dicarboxylic acids may also be used in the form of ester derivatives.

The glycols other than ethylene glycol may include aliphatic glycols such as diethylene glycol, trimethylene glycol, propylene glycol, tetramethylene glycol, neopentyl glycol, hexamethylene glycol, and dodecamethylene glycol; alicyclic glycols such as cyclohexane dimethanol; and aromatic glycols such as bisphenols, hydroquinone, and 2,2-bis-(4-β-hydroxyethoxyphenyl)propane.

It is preferred that the resin used for the bottle of the present invention contains a 1.0% or lower content of a cyclic trimeric oligomer of ethylene terephthalate. If the content is higher than 1.0%, the resin will contain the oligomer too much in the process of recycling the bottle into polymer pellets and the recycled polymer pellets will also contain the cyclic trimeric oligomer too much. When these recycled polymer pellets are used in the spinning, extrusion, injection, or any other molding step, the molds or nozzles may often be fouled with these oligomers and the products may often be stained with these oligomers to lower their quality.

In order to obtain a bottle containing a 1.0% or lower content of a cyclic trimeric oligomer of ethylene terephthalate, the resin used for the bottle should contain a 1.0% or lower content of the cyclic trimeric oligomer. While a process of polyester production is explained with an example in the case of polyethylene terephthalate, a method for obtaining a resin containing a 1.0% or lower content of the cyclic trimeric oligomer is illustrated below.

The starting materials are esterified in the presence of a catalyst for esterification and then liquid phase polymerized in the presence of a catalyst for polymerization, followed by solid phase polymerization, if necessary.

Polyethylene terephthalate is usually produced in the batch system or in the continuous system. A preferred example of the production in the continuous system is described below.

First, a slurry containing terephthalic acid or its ester derivative and ethylene glycol at a ratio of 1.02 to 1.4 moles, preferably 1.03 to 1.3 moles, relative to 1 mole of terephthalic acid or its ester derivative, is prepared and continuously fed to the step of esterification.

The esterification is carried out using a multi-stage apparatus with at least two esterification vessels connected in series under the condition that ethylene glycol is refluxed, while water or alcohols generated by the reaction are removed out of the system with a fractionating column. In the first stage of esterification, the reaction temperature is usually in the range of 240° C. to 270° C., preferably 245° C. to 265° C., and the pressure is usually in the range of 0.2 to 3 kg/cm$^2$G, preferably 0.5 to 2 kg/cm$^2$G. In the final stage of esterification, the reaction temperature is usually in the range of 250° C. to 280° C., preferably 255° C. to 275° C., and the pressure is usually in the range of 0 to 1.5 kg/cm$^2$G, preferably 0 to 1.3 kg/cm$^2$G. If the reaction is carried out in three or more stages, the reaction conditions used for esterification in the intermediate stages stand in between the first stage and the final stage. An increase in reaction rate of esterification over these stages is preferably distributed uniformly to the respective stages. It is desirable that the reaction rate of esterification finally reaches 90% or higher, preferably 93% or higher. These stages in the esterification step give low-level condensates having molecular weights of about 5000.

When terephthalic acid is used as the starting material, the above esterification can be carried out even without catalyst by the catalytic action of terephthalic acid as an acid. It may also be carried out in the presence of a catalyst for polycondensation. In particular, when dimethyl terephthalate is used as the starting material, the reaction can be accelerated by the use of fatty acid salts or carbonates of Zn, Cd, Mn, Co, Ca, Ba, or other elements; magnesium metal; or oxides of Pb, Zn, Sb, Ge, or other elements.

The reaction may preferably be carried out with the addition of tertiary amines such as triethylamine, tri-n-butylamine or benzyldimethylamine; quaternary ammonium hydroxides such as tetraethylammonium hydroxide, tetra-n-butylammonium hydroxide or trimethylbenzylammonium hydroxide; or basic compounds such as lithium carbonate, sodium carbonate, potassium carbonate or sodium acetate in small amounts because the ratio of dioxyethylene terephthalate units in the main chain of polyethylene terephthalate can be kept at a relatively low level.

The resulting low-level condensates are then fed to the step of multistage liquid phase polycondensation. The reaction conditions used for polycondensation are as follows: In the first stage of polycondensation, the reaction temperature is usually in the range of 250° C. to 290° C., preferably 260° C. to 280° C., and the pressure is usually in the range of 500 to 20 Torr, preferably 200 to 30 Torr. In the final stage of polycondensation, the reaction temperature is usually in the range of 265° C. to 300° C., preferably 275° C. to 295° C., and the pressure is usually in the range of 10 to 0.1 Torr, preferably 5 to 0.5 Torr. If the reaction is carried out in three or more stages, the reaction conditions used for polycondensation in the intermediate stages stand in between the first stage and the final stage. An increase in intrinsic viscosity (IV) attained over the stages in polycondensation step is preferably distributed uniformly to the respective stages. The intrinsic viscosity (VI) of the polyethylene terephthalate after the liquid phase polycondensation is usually in the range of 0.35 to 0.80 dl/g, preferably 0.45 to 0.75 dl/g, and more preferably 0.55 to 0.75 dl/g.

The polycondensation is carried out with a catalyst therefor. The catalyst may include germanium compounds such as germanium dioxide, germanium tetraoxide and germanium tetra-n-butoxide; antimony catalysts such as antimony trioxide; and titanium catalysts such as titanium tetrabutoxide. Of these catalysts, germanium dioxide is preferred from the viewpoint of hue and transparency, and antimony trioxide in view of high crystallizability and its low price. The amount of catalyst in terms of the percent by weight of metallic elements relative to the total weight of the starting materials is usually in the range of 0.005 to 0.2 wt %, preferably 0.001 to 0.1 wt %.

The polycondensation is preferably carried out with the addition of phosphate esters such as trimethyl phosphate, triethyl phosphate, tri-n-butyl phosphate, trioctyl phosphate, triphenyl phosphate and tricresyl phosphate; phosphite esters such as triphenyl phosphite, tris(dodecyl)-phosphite and tris(nonyl-phenyl)phosphite; acid phosphate esters such as methyl acid phosphate, isopropyl acid phosphate, butyl acid phosphate, dibutyl phosphate, monobutyl phosphate and dioctyl phosphate; and phosphorus compounds such as phosphoric acid and polyphosphoric acid as stabilizers. The amount of stabilizer in terms of percent by weight of phosphorus element relative to the total weight of the starting materials is usually in the range of 0.001 to 0.1 wt %, preferably 0.002 to 0.02 wt %. The catalyst and the stabilizer may be added in the step of either esterification or polycondensation.

The polyethylene terephthalate obtained in the step of liquid phase polycondensation is extruded and formed by cutting into pellets of 2 to 4 mm in length.

The pellets thus obtained usually have a density of 1.33 to 1.36 g/cm$^3$, a limiting viscosity of 0.4 to 0.75 dl/g, a diethylene glycol content of 1.0 to 4.0 mol %, an acetaldehyde content of 5 to 100 ppm, a cyclic trimeric oligomer content of 0.5 to 4.0 wt %, a glass transition point of 50° C. to 80° C., a melting point of 240° C. to 280° C., and a crystallization temperature of 130° C. to 180° C. as measured in the direction of a temperature rise.

The cyclic trimeric oligomer content can be reduced to 1.0% or lower by adjusting the conditions used for the above polymerization, the amounts of catalyst and stabilizer, and the conditions of an extruder being set at low temperatures when making pellets. In order that the oligomer content is further reduced effectively, the resulting pellets are preferably allowed to cause solid phase polymerization.

The preparation of the polyester has been explained in detail for the continuous system; however, polyethylene terephthalate can also be obtained even in the batch system by changing the conditions used for esterification and polycondensation from the former reaction stage to the latter reaction stage as in the continuous system.

The pellets to be fed to the step of solid phase polymerization are first treated at a temperature of 120° C. to 200° C. under dry conditions, preferably under an atmosphere of an inert gas, for a period of 10 minutes to 4 hours to cause crystallization. In this step, the pellets may be treated under water vapor or under a water vapor-containing inert atmosphere to effectively reduce the acetaldehyde content.

The pre-crystallized pellets are allowed to cause solid phase polymerization at a temperature of 190° C. to 230° C., preferably 195° C. to 225° C., under a pressure of 760 Torr to 10 Torr, preferably the ordinary pressure to 100 Torr, while introducing an inert gas such as nitrogen gas into the system. This solid phase polymerization may be carried out in either a single-stage or a multi-stage manner.

The cyclic trimeric oligomer content can be reduced to 1.0 to 0.2 wt % by the solid phase polymerization. The limiting viscosity of the resin after the solid phase polymerization is preferably adjusted to 0.70 dl/g or higher, more preferably 0.72 dl/g or higher.

The resin after the solid phase polymerization usually has a density of 1.37 to 1.43 g/cm$^3$, a limiting viscosity of 0.7 to 1.4 dl/g, a diethylene glycol content of 1.0 to 4.0 mol %, an acetaldehyde content of 10 ppm or lower, a glass transition point of 50° C. to 80° C., a melting point of 240° C. to 280° C., and a crystallization temperature of 130° C. to 180° C. as measured in the direction of a temperature rise.

The catalyst for polycondensation may also preferably be deactivated because the cyclic trimeric oligomer content cannot be increased so much in the step of recycling the bottle into polymer pellets. The deactivation of the catalyst is carried out by water treatment or water vapor treatment of the pellets of polyethylene terephthalate.

The water treatment of the pellets is carried out by immersion of the pellets in water at a temperature of 40° C. to 120° C., preferably 50° C. to 100° C., for a period of 5 minutes to 10 hours, preferably 10 minutes to 5 hours. As the water for immersion, for example, distilled water or ion-exchanged water can be used. The addition of hydrochloric acid or phosphoric acid can be allowed for reduction of the treatment time. The steam treatment of the pellets is carried out by introduction of water vapor or a water vapor-containing gas or water vapor-containing air at a temperature of 40° C. to 120° C., preferably 50° C. to 110° C., into the atmosphere over the pellets for a period of 20 minutes to 20 hours, preferably 1 hour or 10 hours.

If the water treatment or water vapor treatment of the pellets is carried out in the continuous system, the pellets are continuously put from the top in the inside of a tower-type apparatus for treatment, to which water or water vapor is continuously fed as a parallel flow or counterflow. The treatment can also be carried out in the batch system.

After that, granulated polyethylene terephthalate is dehydrated and dried when treated with water or it can also be transferred as such to the drying step when treated with water vapor.

The drying can be achieved by the drying treatment of polyethylene terephthalate usually used in the art. The continuous drying is carried out by feeding the granulated polyethylene terephthalate from the top into the inside of a hopper and allowing a dried gas to pass from the bottom into the inside of the hopper. The use of a continuous drying machine in the rotary disk-type heating system is also preferred. The drying can also be achieved with a double cone-type rotary drying machine in the batch system.

The deactivation of the catalyst, although it is effective when carried out for the pellets after the solid phase polymerization, may also be carried out for the pellets after the liquid phase polymerization, in which case, however, the degree of polymerization is hardly increased in the subsequent solid phase polymerization.

The polyethylene terephthalate obtained with germanium dioxide as a catalyst for polycondensation is preferred because the deactivation of the catalyst can easily be carried out.

A process for producing a resin to be used for the bottle of the present invention is explained for polyethylene terephthalate as an example. Even when the polyester resin to be used for the bottle of the present invention is a copolymerized polyester, it can also be produced in substantially the same manner as described above.

The polyester chips obtained as described above are formed with an extruder into a preform, which is called "parison", and the preform is molded by blowing an inert gas or dried air thereinto to give a hollow-shaped bottle of the present invention.

In the preparation of a preform, the water content of the pellets is reduced to 0.05% or lower, preferably 0.02% or lower, more preferably 0.01% or lower, and most preferably 0.005% or lower, and the dried pellets are fed to a injection molding machine. The cylinder temperature in the injection molding machine is preferably set at 260° C. to 310° C. on the hopper side, 100° C. to 300° C. in the cylinder intermediate portion, and 240° C. to 295° C. on the nozzle side. The mold temperature is preferably set at 5° C. to 100° C.

The residence time in the injection molding machine is set for 10 to 100 seconds on the average, preferably 20 to 180 seconds, and more preferably to 150 seconds. If the temperature in the injection molding machine is too high or the residence time is too long, the oligomer content is increased or the resin is decomposed and colored to decrease the limiting viscosity and increase the aldehyde content.

The preform thus obtained is formed as a hollow-shaped bottle, for example, by the hot parison method, in which the preform as stands hot is molded by blowing, or by the cold parison method, in which the preform is cooled for storage and reheated to about 70° C. to 140° C. and molded by blowing.

The stretch ratio in the blow molding is preferably in the range of 1.5 to 10 times, more preferably 2 to 6 times, in the circumferential direction, and preferably in the range of 1.3 to 8 times, more preferably 1.5 to 5 times, in the axial direction. The areal ratio is preferably in the range of 3 to times, more preferably 5 to 20 times.

The hollow-shaped bottle after the blow molding may be subjected to heat setting in a mold at a temperature of about 120° C. to 170° C. so that the temperature resistance is increased. The mouth portion of the bottle before or after the blow molding may preferably be heated to a temperature of about 130° C. to 200° C. so that the mouth portion of the bottle is crystallized to prevent its deformation.

Also in the blow molding, if the reheating temperature or the mold temperature is too high, or if the reheating time or the heat setting time is too long, the oligomer content is increased or the resin is decomposed and colored to decrease the limiting viscosity and increase the aldehyde content.

The bottle of the present invention is a hollow-shaped bottle formed as described above, and the bottle may contain a 1.0 wt % or lower content of a cyclic trimeric oligomer of ethylene terephthalate, preferably 0.7 wt % or lower, more preferably 0.6 wt % or lower, and most preferably 0.5 wt % or lower. If the content is higher than 1.0 wt %, the cyclic trimeric oligomer content is increased when the bottle is collected and recycled into polymer pellets without removing the label, so that the molds or nozzles used in the spinning, extrusion, injection, or any other molding of the recycled polymer pellets may often be fouled with these oligomers and the products may often be stained with these oligomers to lower their quality.

The catalyst for polycondensation present in the bottle of the present invention has preferably been deactivated. The deactivation of the catalyst can drastically reduce the amount of cyclic trimeric oligomer formed in the production of recycled polymer pellets.

The measurements of the rate of solid phase polymerization make it possible to determine whether the catalyst has been deactivated or not. The rate of solid phase polymerization can be measured, for example, as follows:

The barrel of the bottle is cut into square-shaped flakes of about 5 mm in each side as a sample, and a ¾-inch stainless steel pipe of 14 cm in length (having both ends provided with screw threads for pipe connection) is filled with this sample over the length of about 10 cm. Both ends of the resin portion are stopped with glass wool so that the sample does not move in the pipe. An elbow-type pipe and a ½-inch pipe of 20 cm in length are connected in this order to each end of this pipe, so that the pipe containing the sample is positioned at the bottom of the U-shaped pipe assembly. Thus, six pipe assemblies containing the samples are prepared. These sample-containing U-shaped pipe assemblies are immersed in a silicone oil bath controlled at 210° C.±1° C. (under the condition that the upper end openings of the pipe assemblies are projecting over the liquid surface), and dried nitrogen gas heated to 210° C. (dew point, −50° C. or lower; oxygen content, ppm or lower) is allowed to pass from one of the upper openings into the inside of each pipe assembly. The contents of the silicone oil bath are well stirred so that the temperature in the oil bath becomes uniform without any distribution. Of these pipe assemblies, three are taken out from the oil bath after two hours and immediately immersed in water at 25° C. for cooling, whereas the other three are kept causing the solid phase polycondensation for further 15 hours, and then taken out from the oil bath and cooled in the same manner.

The samples are taken out from the respective pipe assemblies and measured for limiting viscosity, and the rate of solid phase polymerization is determined by the formula: (the average limiting viscosity of the samples after the treatment for 15 hours plus the average limiting viscosity of the samples after the treatment for 2 hours)/13.

If the rate of solid phase polymerization is 0.0050 dl/g·hr or lower as measured in this manner, it may be construed that the catalyst has already been deactivated. In most cases, the rate of solid phase polymerization is preferably 0.0040 dl/g·hr or lower, more preferably 0.0035 dl/g·hr or lower, and most preferably 0.0030 dl/g·hr or lower. If the catalyst has not yet been deactivated, the rate of solid phase polymerization is usually in the range of 0.006 to 0.03 dl/g·hr.

The bottle of the present invention is preferred to have other specific characteristics: a limiting viscosity of 0.4 to 1.4 dl/g, more preferably 0.7 to 1.4 dl/g; a diethylene glycol content of 1.0 to 4.0 mol %, more preferably 1.0 to 3.0 mol %; and an acetaldehyde content of 40 ppm or lower, more preferably ppm or lower. In the case of a bottle made of polyethylene terephthalate, it is preferred to further have a barrel density of 1.33 to 1.43 g/cm$^3$, more preferably 1.37 to 1.41 g/cm$^3$, a glass transition point of 50° C. to 80° C., a melting point of 240° C. to 280° C., and a crystallization temperature of 130° C. to 180° C. as measured in the direction of a temperature rise.

The label of the present invention has the excellent advantage that the ink layer can easily be removed by immersing the label in alkaline hot water. The use of a heat-shrinkable film as the thermoplastic polymer film of the label makes the ink layer easy to come off and the removal of the ink layer can be made more easily by immersing the label in alkaline hot water.

In particular, the use of a polyester-type heat-shrinkable film makes the label useful for many commercially available PET bottles. When the polyester-type heat-shrinkable film has a shrinkability of 30% to 80%, the label is excellent for practical use as the indication label of various articles.

The incorporation of a compound capable of swelling or soluble in alkaline hot water into the ink layer makes it easy to remove the ink layer from the crushed label in alkaline hot water.

The bottle of the present invention is fitted with a label having an ink layer removable in alkaline hot water and formed on at least one surface of a thermoplastic polymer film. Therefore, the labeled bottle can easily be recycled into thermoplastic polymer pellets because the ink layer can easily be removed from the label after use.

In this case, if the label is made of a thermoplastic polymer of the same type as used in the bottle, there is no need to separate the label from the bottle using the hands or complicated steps of separation such as specific gravity separation in a liquid or by air blowing, and after the removal of the ink layer in alkaline hot water without separating the label from the bottle, the bottle, together with the label, can be fed to the recycling step.

When the label fitted on the bottle has a heat shrinkability of 0.1% or higher but lower than 80% along the circumferential direction of the bottle, separation at the interface between the thermoplastic polymer film and the ink layer can be allowed to arise from the heat shrinkage of the label in the washing step after the collection of waste bottles and labels.

Furthermore, if the bottle is made of a polyester-type thermoplastic polymer containing a 1.0% or lower content of a cyclic trimeric oligomer of ethylene terephthalate, the molds or nozzles used in the step of producing articles from the recycled polymer pellets cannot be fouled with the oligomer, nor can the products be stained with the oligomer to lower their quality.

In the process for ink removal from the label according to the present invention, the label is immersed in alkaline hot water to remove the ink layer from the label, so that the ink layer can easily be separated from the thermoplastic polymer film.

In the process for ink removal from the bottle fitted with the label according to the present invention, the labeled bottle is immersed in alkaline hot water to remove the ink layer from the label on the bottle, so that the ink-removed label and the bottle can be fed to the recycling step without separating the label from the bottle.

In the process for recycling the bottle fitted with the label according to the present invention, the bottle fitted with the label from which the ink layer has been removed by the above process for ink removal is melted and recycled, so that the ink-removed label and the bottle can be recycled without separating the label from the bottle.

The recycled polymer pellets obtained by the above recycling process can be used again for the formation of various articles because they contain substantially no ink.

EXAMPLES

The present invention will be further illustrated by the following Examples; however, the present invention is not limited to these Examples.

The characteristics of labels were determined as follows:

Heat Shrinkability

The distance for sample measurement was set at 200 mm. A label was cut into a width of 15 mm, and the sample was immersed in hot water at 95° C. for 10 seconds. The heat shrinkability was calculated from the lengths of the sample before and after the heat shrinkage.

The Characteristics of Resins were Determined as Follows:

(1) Cyclic Trimeric Oligomer Content

A sample cut from the barrel of a bottle was dissolved in a mixture of hexafluoroisopropanol and chloroform, and chloroform was further added for dilution. Methanol was added to this solution, and the precipitated polymer was filtered. The filtrate was evaporated to dryness, and the residue was dissolved in dimethylformamide to a constant volume. The cyclic trimeric oligomer content was determined by liquid chromatography.

(2) Limiting Viscosity

A sample cut from the barrel of a bottle was used, and the limiting viscosity was determined from the solution viscosity as measured in a mixed solvent of 1,1,2,2-tetrachloroethane and phenol (2:3 by weight) at 30° C.

(3) Diethylene Glycol Content

A sample cut from the barrel of a bottle was decomposed by methanol, and the diethylene glycol content was determined by gas chromatography and expressed in terms of percent moles (mol %) relative to the total moles of glycol components.

(4) Acetaldehyde Content

A sample cut from the barrel of a bottle and distilled water were put into a nitrogen-filled glass ampule at a ratio of 1 g: 2 ml, and the mouth of the ampule was sealed by melting. The extraction was carried out at 160° C. for 2 hours. After cooling, the extract was determined for the acetaldehyde content by high sensitive gas chromatography, and the acetaldehyde content was expressed in terms of concentrations (ppm).

(5) Density

A sample cut from the barrel of a bottle into square-shaped flakes of about 1 cm in each side was used, and the density was determined in a tube with a density gradient formed from a mixed solvent of carbon tetrachloride and n-heptane at 25° C.

(6) Glass Transition Point, Melting Point, and Crystallization Temperature as Measured in the Direction of a Temperature Rise The measurement was carried out with a differential scanning calorimeter (DSC). After dried at 140° C. under a pressure of 10 Torr or lower for hours, a slice of about 10 mg in weight was held on an aluminum pan and sealed under an atmosphere of nitrogen gas. This sample was set in the DSC, and the temperature was raised at a rate of 100° C./min. or higher. The sample was kept in molten state at 290° C. for 10 minutes and then rapidly cooled to −20° C. or lower by introduction of liquid nitrogen. The differential scanning calorimetry was started at a rate of 10° C./min. for temperature rise, and each data was determined as the peak temperature.

Example 1

Ink materials were prepared in various colors by addition of ethylene glycol monobutyl ether at 1.0 wt % (after dried)

to Shrink EX (available from Toyo Ink Manufacturing Co., Ltd.). A polyester-type heat-shrinkable film of 50 μm in thickness (having a heat shrinkability of 72% in the direction which will become the circumferential direction after the formation of labels; S5630 available from Toyo Boseki K.K.) was printed all over with green, gold, and white colors in this order by the gravure printing method, and dried in an oven at 60° C. The total thickness of the ink layer was 10 μm. The printed film was formed into a tubular shape having a circumference equal to the maximum external circumference of bottles plus 20 mm, and then cut to give a label of 12 cm in width.

The label was fitted from the neck to the barrel of a 2-liter PET bottle, and shrunk in a steam tunnel at 80° C. The label was removed with scissors and immersed in a 3% aqueous sodium hydroxide solution at 95° C. with stirring for 30 minutes. The label was taken out and observed, and it was found that the ink layer had been completely removed. After washing and drying the ink layer and the label, it was easy to pulverize the ink layer into a size of 1 mm or smaller by simply taking the ink layer apart in the hands, and to separate the pulverized ink from the label by air blowing with a wind velocity of 15 m/sec using a cyclone. The recycled polymer pellets obtained by the process as shown in FIG. 1 were found by visual observation to have no coloring.

Example 2

A label was prepared and tested in the same manner as described in Example 1, except that a styrene-acrylic acid copolymer was substituted for ethylene glycol monobutyl ether and the amount thereof was changed to 4.0 wt % (after dried). The label was taken out and observed, and it was found that the ink layer had been completely removed.

Example 3

A label was prepared and tested in the same manner as described in Example 2, except that a polystyrene-type heat-shrinkable film (made of a styrene-butadiene copolymer: EPS-35G, 60 μm in thickness) was substituted for the polyester-type heat-shrinkable film. The label was taken out and observed, and it was found that the ink layer had been completely removed.

Comparative Example 1

A label was prepared and tested in the same manner as described in Example 1, except that ethylene glycol monobutyl ether was not added to the ink. The label was taken out and observed, and it was found that almost the entire ink layer remained unremoved.

Example 4

A stainless steel autoclave equipped with a stirrer, a thermometer, and a fractional reflux condenser was charged with 460 g of dimethyl terephthalate, 460 g of dimethyl isophthalate, 29 g of fumaric acid, 341 g of ethylene glycol, 650 g of 3-methylpentandiol, and 0.52 g of tetra-n-butyl titanate, and heated to 160° C. to 220° C. to cause transesterification for 4 hours. The temperature was raised to 250° C., and the pressure over the reaction mixture in the autoclave was gradually reduced to 0.2 mmHg, at which the reaction was continued for 1.5 hours to give a polyester resin. The resulting polyester rein A was pale yellow and transparent.

A glass flask equipped with a stirrer, a thermometer, and a reflux condenser was charged with 75 g of a polyester resin which was the same as obtained in the Production Example for Polyester Resin, except that fumaric acid was copolymerized at 5 mol % in the acid components; 56 g of methyl ethyl ketone; and 19 g of isopropyl alcohol, and heated with stirring so that the resin was dissolved. A solution of 17.5 g of methacrylic acid, 7.5 g of ethyl acrylate, and 1.2 g of azobisdimethylvaleronitrile dissolved in 10 g of methyl ethyl ketone was added dropwise to the resin solution at a constant rate, and the mixture was further stirred for 3 hours. After that, 300 g of water and 25 parts of triethylamine were added to the reaction solution, and the mixture was further stirred for 1 hour. The temperature of the solution was raised to 100° C., and the methyl ethyl ketone, the isopropyl alcohol, and excess triethylamine were removed by distillation to give an acryl-modified polyester resin.

The above acryl-modified polyester rein was applied to the surface of a polyester-type heat-shrinkable film of 50 μm in thickness (having a heat shrinkability of 72% in the direction which will become the circumferential direction after the formation of labels; S5630 available from Toyo Boseki K.K.), and dried at 60° C. to give an intermediate of 0.1 μm in thickness. The surface of the intermediate layer was printed all over with green, gold, and white colors in this order by the gravure printing method, and dried in an oven at 60° C. The total thickness of the ink layer was 10 μm. The printed film was formed into a tubular shape having a circumference equal to the maximum external circumference of bottles plus 20 mm, and then cut to give a label having a height of 12 cm. The label was fitted from the neck to the barrel of a 2-liter PET bottle, and shrunk in a steam tunnel at 80° C. The label was removed with scissors and immersed in a 3% aqueous sodium hydroxide solution at 95° C. with stirring for 30 minutes. The label was taken out and observed, and it was found that the ink layer had been completely removed. The recycled polymer pellets obtained according to the process as shown in FIG. 1 were found by visual observation to have no coloring.

Example 5

A label was prepared and tested in the same manner as described in Example 4, except that a polystyrene-type heat-shrinkable film (made of a styrene-butadiene copolymer: EPS-35G, 60 μm in thickness) was substituted for the polyester-type heat-shrinkable film. The label was taken out and observed, and it was found that the ink layer had been completely removed.

Example 6

Particles of polyethylene terephthalate (containing talc at 500 ppm) having an intrinsic viscosity of 0.80 and a softening point of 256° C. were dried in a vacuum and then fed to an injection molding machine to form a molded cap with a mold having a screw thread on the inside and a cylindrical shape on the outside (mold temperature, 10° C.; cylinder setting temperature, 256–280° C.). A sheet of a block copolymer containing polytetramethylene glycol at 30 wt % and butanediol at 2 wt %, which copolymer was obtained by transesterification of dimethyl terephthalate, butanediol, ethylene glycol, and polytetramethylene glycol (average molecular weight, 800) in the presence of a catalyst, followed by polycondensation in a high vacuum, was independently formed into a thickness of 1.2 mm, and a circle was punched out from the sheet and put into the above cap as an inner cover to give a polyester cap.

A label was prepared and tested in the same manner as described in Example 1, except that the bottle was fitted with the polyester cap and the recycling process was carried out for the capped bottle. The label was taken out and observed, and it was found that the ink layer had been completely removed. The recycled polymer pellets obtained from the bottle, the cap, and the label according to the process as shown in FIG. 1 were found by visual observation to have no coloring.

Example 7

Ink materials were prepared in various colors by addition of ethylene glycol monobutyl ether at 1.0 wt % (after dried) to Shrink EX (available from Toyo Ink Manufacturing Co., Ltd.). A polyester-type heat-shrinkable film of 50 μm in thickness (having a heat shrinkability of 72% in the direction which will become the circumferential direction after the formation of labels; S5630 available from Toyo Boseki K.K.) was printed all over with green, gold, and white colors in this order by the gravure printing method, and dried in an oven at 60° C. The total thickness of the ink layer was 10 μm. The printed film was formed into a tubular shape having a circumference equal to the maximum external circumference of bottles plus 20 mm, and then cut to give a label of 12 cm in width.

A 2-liter bottle was formed of polyethylene terephthalate having an oligomer content of 0.35 wt % and a limiting viscosity of 0.8 dl/g, in which the germanium catalyst used for polycondensation had already been deactivated by water treatment. The barrel of the bottle had an oligomer content of 0.37 wt %, a limiting viscosity of 0.75 dl/g, an acetaldehyde content of 5 ppm, a diethylene glycol content of 2.0 mol %, a rate of solid phase polymerization of 0.0027 dl/g·hr, a glass transition point of 77° C., a melting point of 255° C., and a crystallization point of 145° C. as measured in the direction of a temperature rise.

This bottle was fitted with the label obtained above, and cut, together with the label, into square-shaped flakes of about 1 cm in each side with a shredder. These flakes were immersed in a 3% aqueous sodium hydroxide solution at 95° C. for 30 minutes. After the treatment, it was found that the ink layer was completely removed from the label. These flakes were taken out from the solution, washed three times with water, and dried at 140° C. under a nitrogen atmosphere having a pressure of 5 Torr for 5 hours. These flakes were formed into recycled polymer pellets with a double axis extruder of 30 mmφ (available from Ikegai Corporation), at which time the cylinder temperature was 290° C. and the average residence time was 150 seconds.

The recycled polymer pellets had an oligomer content of 0.39 wt %.

Comparative Example 2

The recycled polymer pellets were obtained in the same manner as described in Example 7, except that the bottle was formed of polyethylene terephthalate having an oligomer content of 0.9 wt % and a limiting viscosity of 0.56 dl/g, in which the germanium catalyst used for polycondensation had not been deactivated. The barrel of the bottle had an oligomer content of 1.2 wt %, a limiting viscosity of 0.54 dl/g, an acetaldehyde content of 25 ppm, a diethylene glycol content of 2.0 mol %, a rate of solid phase polymerization of 0.009 dl/g·hr, a glass transition point of 76° C., a melting point of 253° C., and a crystallization point of 155° C. as measured in the direction of a temperature rise.

The recycled polymer pellets had an oligomer content of 1.5 wt %.

What is claimed is:

1. A label comprising a thermoplastic heat-shrinkable polyester film and an ink layer formed on at least one surface thereof, wherein the ink layer swells in alkaline hot water and is thereby removable in alkaline hot water by separation at the interface between the heat-shrinkable film and the ink layer arising from the heat shrinkage of the heat-shrinkable film, the ink layer exhibiting an ink removal ratio of 90% or higher, when a sample label of 1 gm in weight is cut into square-shaped flakes of 1 cm in each side and then stirred in 100 cc of 3% aqueous sodium hydroxide solution at 90° C. for 30 minutes, followed by washing and drying.

2. The label according to claim 1, wherein the heat-shrinkable film has a heat shrinkability of 30% to 80%.

3. The label according to claim 1, wherein the ink layer contains a compound capable of swelling or soluble in alkaline hot water.

4. A bottle comprising the label according to claim 1.

5. The bottle according to claim 4, wherein the label is made of a thermoplastic polymer of the same type as used in the bottle.

6. The bottle according to claim 4, wherein the ink layer after treated in alkaline hot water, dried, and pulverized can be separated from the label by air blowing.

7. The bottle according to claim 4, further comprising a cap made of a thermoplastic polymer of the same type as used in the bottle.

8. The bottle according to claim 7, wherein the thermoplastic polymer contains at least one selected from ethylene terephthlate and ethylene naphthalate repeating units.

9. The bottle according to claim 4, wherein the bottle is made of a thermoplastic polymer containing a 1.0% or lower content of a cyclic trimeric oligomer of ethylene terephthlate.

10. A bottle comprising the label according to claim 1, the label having a heat shrinkability of 0.1% or higher but lower than 80% along the circumferential direction of the bottle.

11. A label comprising a thermoplastic heat-shrinkable polyester film and an ink layer formed on at least one surface thereof, between which an intermediate layer that swells in alkaline hot water and is thereby removable in alkaline hot water is formed, the intermediate layer attaining an ink removal ratio of 90% or higher, when a sample label of 1 gm in weight is cut into square-shaped flakes of 1 cm in each side and then stirred in 100 cc of 3% aqueous sodium hydroxide solution at 90° C. for 30 minutes, followed by washing with water and drying.

12. The label according to claim 11, wherein the heat-shrinkable film has a heat shrinkability of 30% to 80%.

13. The label according to claim 11, wherein the ink layer contains a compound capable of swelling or soluble in alkaline hot water.

14. A bottle comprising the label according to claim 11.

* * * * *